United States Patent [19]

Bottini

[11] Patent Number: 4,472,163
[45] Date of Patent: Sep. 18, 1984

[54] MULTI-GEAR FREE WHEEL ASSEMBLY FOR DERAILLEURS FOR BICYCLES

[75] Inventor: Luigi Bottini, Monza, Italy

[73] Assignee: Societe Italiana Catene Calibrate Regina S.p.A., Milan, Italy

[21] Appl. No.: 204,903

[22] Filed: Nov. 7, 1980

[30] Foreign Application Priority Data

Nov. 7, 1979 [IT] Italy .............................. 230493/79[U]

[51] Int. Cl.³ ........................ F16H 55/30; B25G 3/16; F16D 23/00
[52] U.S. Cl. ...................................... 474/160; 192/64; 403/349
[58] Field of Search ........................ 474/160; 192/64; 403/348, 349

[56] References Cited

U.S. PATENT DOCUMENTS 1,130,726  3/1915  Greve .................................... 403/348
3,168,836  2/1965  Militana ................................ 74/243
3,900,088  8/1975  Ozaki .................................... 474/160

FOREIGN PATENT DOCUMENTS 985061    2/1949  France ................................ 474/160
403651    5/1943  Italy ..................................... 403/349
1568210   5/1980  United Kingdom ................ 403/349

Primary Examiner—John E. Murtagh
Assistant Examiner—Andrew Joseph Rudy
Attorney, Agent, or Firm—Cushman, Darby & Cushman

[57] ABSTRACT

The invention concerns a multi-gear free wheel assembly, in particular for derailleurs for bicycle, comprising a sprocket mounted on a hub by means of a unidirectional clutch, characterized by the fact that the toothed wheels on the sprocket form a single whole with a bell which can be solidly coupled to said sprocket by locking means which are manually connectable and disconnectable without the aid of tools, said bell being held firm by a pressure spring.

7 Claims, 4 Drawing Figures

MULTI-GEAR FREE WHEEL ASSEMBLY FOR DERAILLEURS FOR BICYCLES

The present invention relates to a multi-gear free wheel assembly for derailleurs for bicycles having a type of construction conferring on it a particular advantageous use.

The multi-gear free wheel assemblies of known type normally consist of a central core adapted to be screwed onto the hub of the bicycle wheel; on the free wheel hub, with ball-bearing rings interposed, a sprocket is mounted which carries toothed gears, these being screwed or keyed onto said sprocket.

Between sprocket and hub provision is made for a unidirectional clutch (toothed gears on the sprocket and ratchet gears on the hub) which engages in the one direction of the rotation and frees them in the opposite direction.

Normally, racing bicycles are sold by the manufacturer with a set of standard gear ratios.

Should the purchaser wish to change the free wheel assembly toothed gears in order to vary these ratios, suitable tools are required. The user has thus in the ordinary way to use the services of a skilled machanic in order to have this operation performed.

The object of the present invention, on the other hand, is to provide a multi-gear free wheel assembly for bicycle derailleurs, in which the ratios can be readily substituted without having to call in skilled personnel and, above all, without having to use any item of equipment.

With this object in view, the invention embodies a multi-gear free wheel assembly, in particular for bicycle derailleurs, comprising a sprocket mounted on a hub with a unidirectional clutch, characterized by the fact that the sprocket forms a whole with a bell which can be solidly coupled to said sprocket by means of a manually disconnectable coupling system.

Said manually disconnectable coupling systems comprise a bayonet joint having a plurality of teeth and a plurality of projections, on the bell and sprocket respectively, which teeth and which projections engage under the action of a pressure spring.

The structural and functional characteristics of the invention, and its advantages over the known art, will become clearer from the following exemplifying description, referred to the attached drawings, in which.

Figure 1:
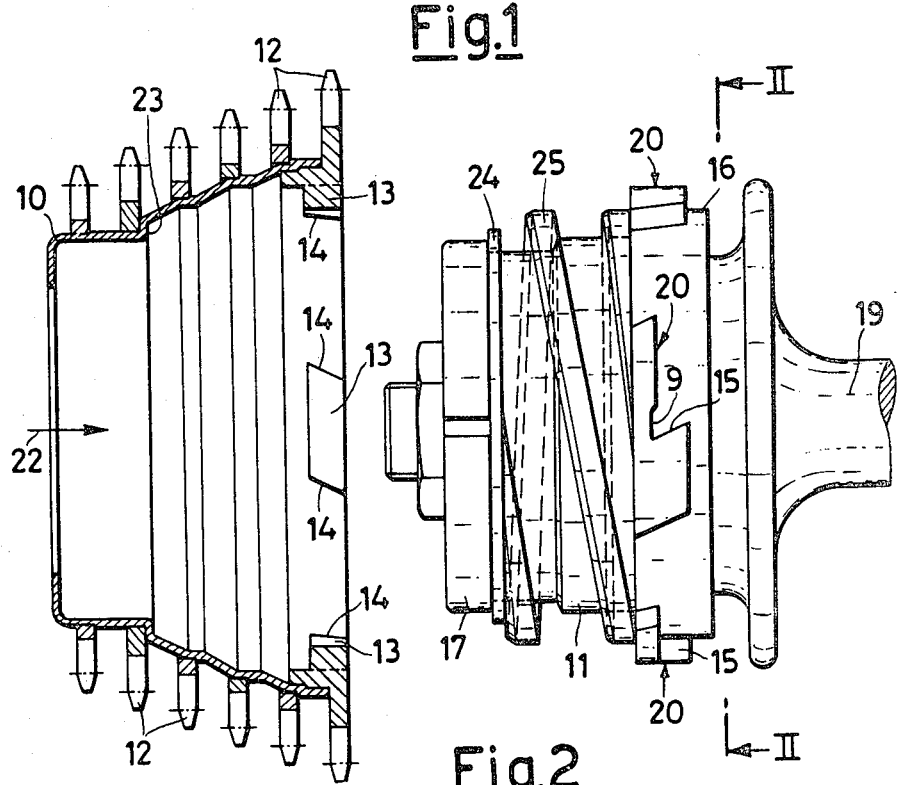
FIG. 1 is a blown-up, partially cross-sectional view illustrating a free-wheel assembly according to the invention.

With reference to FIG. 1 of the drawings, the free wheel assembly in question comprises a bell (10) and a sprocket (11) to which the bell (10) can be coupled in a removable manner.

The bell (10) has an essentially truncated-cone configuration, and on it are fixed a series of pinions (12) (for example six) each with a different number of teeth.

The bell (10) is open at its bases and features internally, at the larger base, four teeth (13) set at right-angles to each other.

Each tooth (13) features a pair of inclined surfaces (14), the function of which will be explained hereafter.

The sprocket (11) is mounted, freely rotatable in one direction only, on the hub of the free wheel assembly which in turn is screwed onto the hub (18) extending laterally from the axel (19) of a bicycle wheel (not shown). The sprocket (11) is mounted on the hub of the free wheel assembly by means of a unidirectional clutch 11a, of conventional type such clutch enabling it to rotate freely in one direction vis-à-vis the hub but locks it to said hub in the opposite direction of rotation. The sprocket (11) has a shape essentially complementary to the inside shape of the bell (10) and, at its larger base (16), has four projections (20) at right-angles to one another. Each projection (20) has an inclined surface (15) complementary to the inclined surfaces (14) of the teeth (13). On the sprocket (11) is mounted a helical spring (25), the terminal coils of which abut respectively on the larger base (16) and on a snap ring (24), which, in turn, rests against the lesser base (17).

The snap ring (24) projects radially from the lesser base (17) inasmuch as it is intended to cooperate with an annular ledge (23) formed on the inside of the bell (10).

Figure 3:
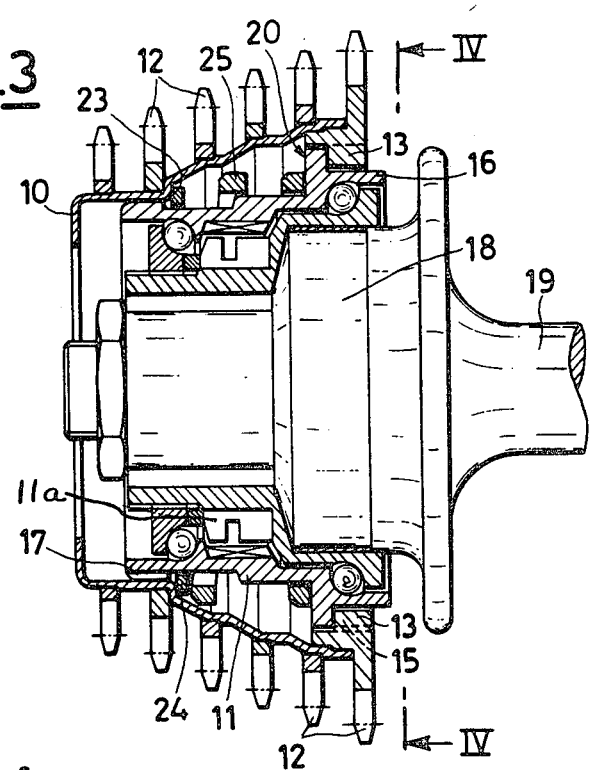
FIG. 3 is a longitudinal section illustrating the free wheel assembly of FIG. 1 in an assembled condition.
Figure 4:
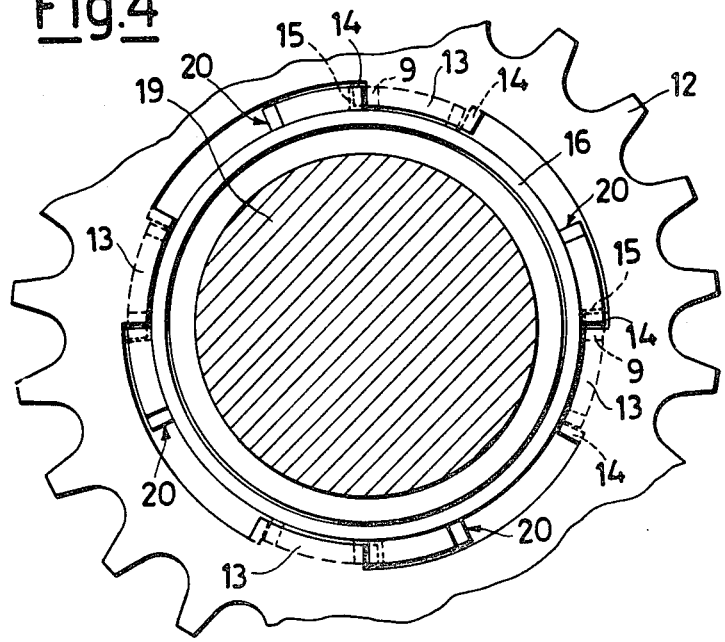
FIG. 4 is a section drawn along the line VI-VI of FIG. 3.

The coupling of the bell (10) to the sprocket (11) from the position of FIG. 1 to that of FIG. 3 is effected by placing the sprocket (11) into the bell (10) in the axial direction of the arrow (22) and thrusting it with a force sufficient to compress the spring (25) until the teeth (13) overreach the respective projections (20); at this point, the bell (10) is rotated anticlockwise (looking at the drawing) as indicated by the arrow (21), until the teeth (13) overlap the projections (20). With the pressure on the bell (10) now released, the spring (25) will bring the teeth (13) into engagement with the projections (20). The dovetailing of the surfaces (14) and (15) is promoted by the presence of an undercut (9) on the projections (20).

Figure 2:
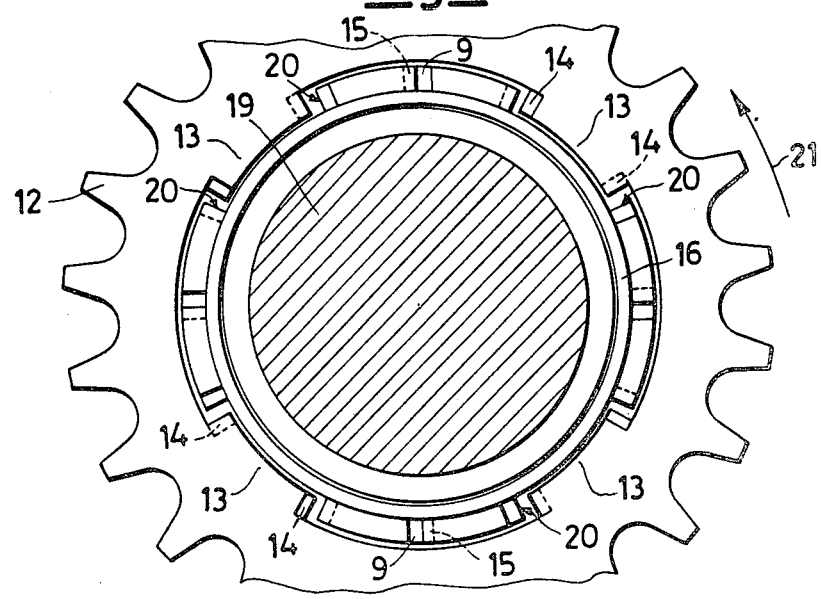
FIG. 2 is a section drawn along the line II-II of FIG. 1.

The bell (10) is quickly removed from the sprocket (11) by hand, more exactly by pressing the bell (10), again in the axial direction as indicated by the arrow (22), against the action of the spring (25), until the inclined surfaces (14) disengage the inclined sufaces (15), by rotating the bell (10), again in the direction indicated by the arrow (21), until the teeth (13) are taken out of the trajectory of the projections (20) (i.e. between one projection (20) and the successive one, as shown in FIG. 2); at this juncture, when the manual pressure is released, the previously compressed spring (25) will thrust the bell (10) to a position in which it can be freely removed from the sprocket (11).

The salient advantages of the invention described above can be summarized as follows :
easy and quick substitution of the gear ratios;
no need for tools for assembly and disassembly;
possiblity of assembling and disasembling the pinions while leaving the other parts of the free wheel assembly mounted on the bicycle wheel.

I claim:

1. A multi-gear free wheel assembly, in particular for derailleurs for bicycles, comprising a sprocket assembly including a sprocket and plurality of toothed wheels, said assembly being mounted on a hub by means of a unidirectional clutch, characterized by the fact that the toothed wheels form a single whole with a bell which can be solidly coupled to said sprocket by locking means which are manually connectable and disconnectable without the aid of tools, said bell being held firm by a pressure spring.

2. A free wheel assembly according to claim 1, characterized by the fact that said locking means comprise a bayonet joint.

3. A free wheel assembly according to claim 1 characterized by the fact that the sprocket is solid with the toothed wheels.

4. A free wheel assembly according to claim 1 in which the bell features coupling projecions (threading, grooves, etc.) for securing the sprocket toothed wheels to the bell.

5. A free wheel assembly according to claim 2, characterized by the fact that said bayonet joint comprises a plurality of teeth (13) and a plurality of projections (20) on the bell (10) and sprocket (11), respectively, which teeth (13) and projections (20) feature respective inclined surfaces (14) and (15) adapted to dovetail one with the other, a pressure spring (25) acting between said bell (10) and said sprocket (11).

6. A free wheel assembly according to claim 5, characterized by the fact that said teeth (13) and projections (20) are four in number and set at right-angles one to the other.

7. A free wheel assembly according to claim 5, characterized by the fact that said sprocket has a larger base and a lesser base and by the fact that said spring (25) is a helical spring mounted on the sprocket (11) with its terminal coils abutting respectively on the larger base (16) of the sprocket (11) and on a snap ring (24) which in turn abuts on the lesser base (17) of the sprocket (11), said snap ring (24) projecting radially from said lesser base (17) and cooperating with an internal annular ledge (23) of the bell (10).

* * * * *